March 21, 1939.  V. V. VACQUIER  2,151,627
APPARATUS FOR AND METHOD OF MEASURING THE TERRESTRIAL MAGNETIC FIELD
Filed Oct. 28, 1938
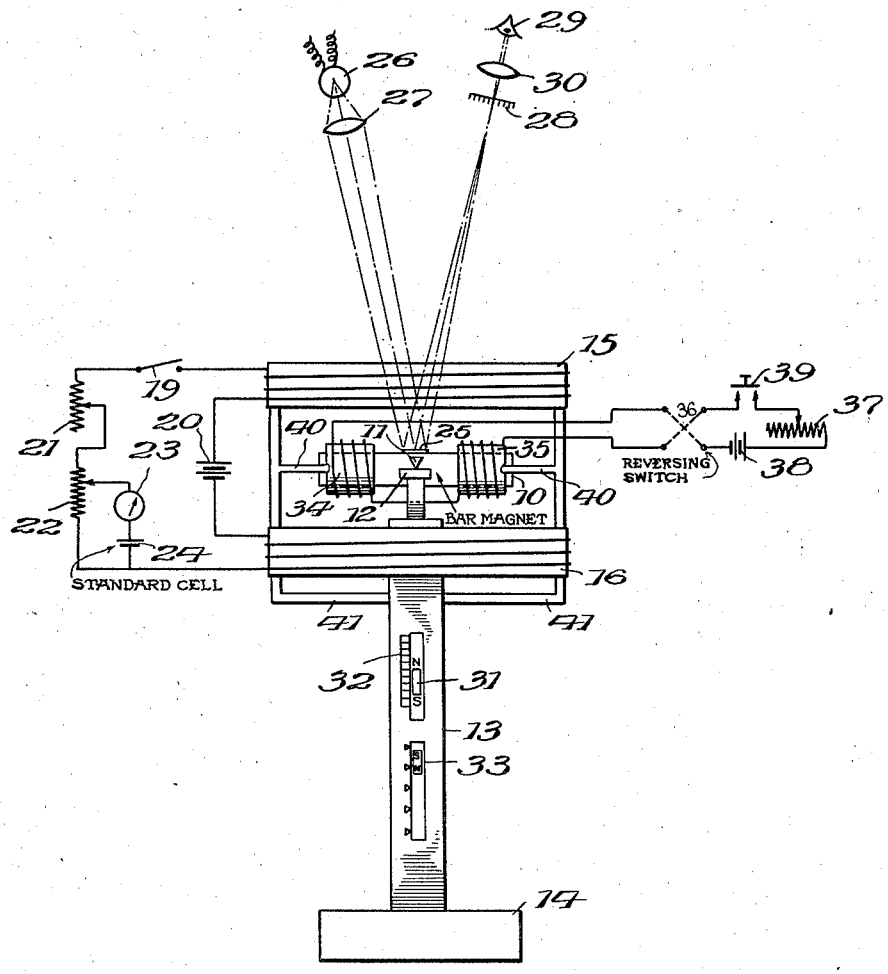
Inventor
V. V. Vacquier,
By A. M. Houghton
his Attorney Patented Mar. 21, 1939

2,151,627

UNITED STATES PATENT OFFICE 2,151,627

APPARATUS FOR AND METHOD OF MEASURING THE TERRESTRIAL MAGNETIC FIELD

Victor V. Vacquier, Oakmont, Pa., assignor to Gulf Research & Development Company, Pittsburgh, Pa., a corporation of Delaware Application October 28, 1938, Serial No. 237,590

5 Claims. (Cl. 175—182)

This invention or discovery relates to improvements in apparatus for and methods of measuring the terrestrial magnetic field; and it comprises a balance for the absolute measurement of the vertical intensity of the terrestrial magnetic field, comprising in combination a symmetrical bar magnet, means for suspending the magnet in the terrestrial field constructed and arranged to permit the magnet to tilt freely in a vertical plane, electrical means for applying a substantially uniform magnetic field around the magnet sufficiently to bring the magnet to a substantially horizontal position, and means for reversing the magnetism of the suspended magnet at will whereby to detect asymmetry of the magnet and suspending means; and it further comprises a method of absolute terrestrial vertical magnetic field intensity measurement including the steps of locating a suspended magnet in the terrestrial magnetic field free to move in a vertical east-west plane, applying to the magnet electrically a substantially uniform magnetic field of strength sufficient to bring the magnet to a substantially horizontal reference position, measuring the applied field strength, and reversing the magnetism of the magnet so as to detect asymmetry of the axis of suspension of the magnet with respect to the center of gravity of the magnet; all as more fully hereinafter set forth and as claimed.

Among the objects achieved in the invention are the provision of an improved magnetic balance, adapted for the absolute measurement of the vertical component of the terrestrial magnetic field and provided with means for reversing the magnetism of the balance needle at will whereby to eliminate errors due to imperfect mechanical balance of the magnet; the provision of an improved magnetic balance of simple character suitable for geophysical work of high precision; and the provision of an improved, absolute method of measuring the vertical component of the terrestrial magnetic field, on the null principle.

Some geophysical studies involve investigations of the magnetic field of the earth. The terrestrial magnetic field varies in intensity and direction from place to place and the variations correspond in part to anomalies of the sub-surface geological structure. Magnetic measurements, properly interpreted, afford some information as to sub-surface structure. In particular, it is often desired to measure the intensity of the vertical component of the earth's field. Since the variations in this quantity are in general small, high precision and sensitivity of measurement are required. And since the measurements must be made in rough country, often by relatively unskilled operators, the means and methods of measurement should be simple and reliable. No system of absolute measurement hitherto known has met all these rather drastic requirements to a sufficiently high degree.

The best instrument hitherto known for determining variations in this quantity from place to place is the Schmidt balance; the balance, however, not being adapted for absolute measurement. The Schmidt balance in its typical form includes a bar magnet or "needle", mounted for oscillation about a horizontal axis slightly above the center of gravity. The magnet is oriented east and west, so as to eliminate the effect of the horizontal terrestrial magnetic component, and it takes an inclined equilibrium position corresponding to the intensity of the vertical component of the terrestrial magnetic field. The balance needle is provided with an eccentric weight which can be adjusted to overcome most of the tilting effect of the earth's field, and a final balancing adjustment is made with the aid of small compensating magnets. The required position of the compensating magnets varies from place to place and the relative positions are taken as indications of the relative value of the vertical component. The range of values that this instrument can measure is limited by the adjusting range of the compensating magnets. Absolute values cannot be measured because the magnetic moment and the degree of mechanical unbalance of the needle are unknown.

According to the present invention I provide a balance system in which the disadvantages of the Schmidt type of balance are overcome and new advantages are achieved. The vertical component of the terrestrial field is measured on the absolute basis by neutralizing the terrestrial field with a magnetic field applied by electrical means advantageously supplemented by one or more small, adjustable permanent magnets so as to facilitate the neutralization or balancing of the terrestrial field. The arrangement is well adapted for portable systems. In accordance with the invention, in order to eliminate error due to mechanical instability of the balance needle, I provide means for reversing the magnetism of the needle at will, so that the true balance position can be determined, or asymmetry of the center of gravity of the needle otherwise compensated for. Details of the apparatus and method will be clear from the extended description to follow.

In the accompanying drawing there is shown diagrammatically an apparatus within the purview of the invention and capable of utilization in carrying out the described method. The drawing represents the new magnetic balance in elevation.

Referring to the drawing, the apparatus is shown as comprising a magnet 10, conveniently though not necessarily shaped as a bar or "needle" as shown, and supported for rotation about an axis very slightly above its center of gravity by means of knife-edges 11, of quartz or other suitable material one on each side thereof, resting on level plates 12 of quartz or the equivalent. The magnet can take other forms if desired, e. g. spherical, but the bar shape is convenient. Only one knife-edge and plate shows in the drawing. The plates are mounted on a standard 13 having a base 14. Elements 11, 12, 13 and 14 are of nonmagnetic material. In use, the axis of knife-edges 11 is alined horizontally, magnetically north and south, so that only the vertical component of the terrestrial field can affect the magnet. The bar 10, were it not magnetized, would assume a horizontal position as shown, the position of gravitational balance or equilibrium being very sensitive because of the small separation of the axis of rotation from the center of gravity as described. That is, the gravitational restoring force, tending to bring the bar horizontal, is made very small. Under the influence of the terrestrial magnetic field, the bar magnet is subjected to a tilting force couple of magnitude depending on the intensity of the vertical component of the terrestrial field at the place where the apparatus is set up.

The angular position of the bar magnet is determined with the aid of a suitable optical system, shown as of conventional form and comprising a small plane mirror 25 affixed to the magnet. A narrow-filament lamp 26 and lens 27 are arranged to focus a spot of light on a scale 28, the beam being reflected from the mirror as shown, and the spot of light moves across the scale as the bar magnet moves about its axis. The scale is read by the eye 29 with the aid of an ocular 30.

The effect of the vertical component of the earth's field on the magnet is neutralized by application of an adjustable, uniform magnetic field. The means for doing this ordinarily takes the form of a Helmholtz coil arrangement, comprising two horizontal, interconnected coils 15 and 16 spaced as shown equi-distant above and below the magnet. The coils are arranged to be energized by means of a battery 20, in series with the coils, a switch 19, a rheostat (variable or adjustable resistance) 21, and a potentiometer 22 which includes a galvonometer 23 and a standard cell 24, the potential of which is known accurately. Upon closing of the switch the coils are energized, and a quite uniform magnetic field is applied to the magnet. For greatest uniformity the coils are separated by a distance equal to their radius, and the magnet is symmetrically located in the intercoil space as shown, but the field will still be substantially uniform if this geometrical arrangement is departed from slightly; especially if large-radius coils are employed. By adjusting resistance 21 the applied field strength can be made such as to just bring the magnet to a standard position or approximately thereto. The measurement is thus made on the null or balancing principle. The intensity of the applied field, as determined with the aid of the potentiometer and taking into account the instrumental constants of the coils, provided exact counterbalancing can be secured and provided that the needle is exactly balanced, is a measure of the intensity of the vertical component of the terrestrial magnetic field (hereinafter referred to as V). Thus, denoting the electromotive force of the standard cell as E, and the resistance included in the standard cell circuit as R, then when the potentiometer is balanced the coil current I is given by Ohm's law, $I = E/R$, and since magnetic balance has been obtained, the vertical field intensity V is simply $V = CI = CE/R$ where C is the instrumental constant which is readily determined for the electrical circuit in ways known per se.

The Schmidt balance and the use of Helmholtz coils to neutralize V as thus far described are known. The precision depends largely on having the center of gravity of the needle directly below the axis of rotation of the needle; but this condition often does not obtain. Also, in practice, it is sometimes difficult to secure exact balance by adjustment of the rheostat 21, because of mechanical shortcomings. Because of the high precision of current measurement required, it is necessary to employ for rheostat 21 a plug-type resistance box, in which type of adjustable resistance the resistance can only be varied in finite increments of fairly large magnitude.

As regards the displacement of the center of gravity of the bar magnet, this may be due to warping, temperature effects, wear of the knife edges, presence of foreign matter (e. g. dust), etc. Such a shift sets up a gravitational moment $mgb$ (where $mg$ is the total weight which acts on one side or the other of the axis, and $b$ is the equivalent lever arm through which the weight acts) tending to make the balance point change, and if the amount of this moment is not known, error will occur in the results.

According to the invention this source of error is obviated by providing fixed coils 34 and 35, surrounding the bar magnet but out of contact therewith, for the purpose of reversing the polarity of the bar magnet at will. Coils 15, 16, 34 and 35 are supported by supporting members indicated diagrammatically at 40 and 41, as shown. Enough clearance is provided between the interior of coils 34 and 35, and the bar magnet, to allow the magnet to tilt up and down slightly. The coils are connected through a reversing switch 36, a push button switch 39 and rheostat 37, with a battery 38, so that the bar magnet can be magnetized in either direction at will by momentary application of a current, the strength of which is determined by the setting of rheostat 37. By reversing the magnetism, the direction of deflection of the bar magnet in the earth's field is reversed. In one case the moment due to shift of center of gravity with respect to the axis, adds to the deflection, and in the other case it subtracts therefrom. At true balance position the moment described becomes equal to zero, and this position is therefore the only one in which the net deflection will not change when the magnetism is reversed with the field neutralized by the Helmholtz coils. The true balance position is the position which the needle would assume if subjected to no magnetic forces at all.

There are two convenient modes of operation of the invention. In both modifications the balance is first leveled and oriented east and west in a known way.

In one mode of operation, advantage is taken of the fact that at the true balance position of the needle, the results are independent of the strength of the needle. The procedure is first to adjust (at 21) the Helmholtz coil current so as to bring the needle to the true balance position. The operator knows when this position is obtained by reversing the magnetism of the needle (at 36) a few times while adjusting resistance 21. When the deflection at scale 28 stays constant when the magnetism is reversed, (1) the needle is at the true balance position and (2) the terrestrial field is exactly balanced by the Helmholtz current (and the compensating magnets 32 and 33 if these are used as described below). Then the value of the vertical intensity of the terrestrial field is exactly equal to the value of the applied magnetic field.

It sometimes happens that the true balance position of the needle is such that the indicating light beam at scale 28 is off scale or in at an inconvenient point on the scale. In this case the mode of operation is modified as follows, to include a step of determining the ratio of the magnetic moments of the needle in the two directions of magnetization. This quantity is necessary in making the calculations, as will be described later.

First, the Helmholtz coils are energized to neutralize the terrestrial field approximately; the approximate current required being known from previous observations in the same territory. Then the needle is magnetized in one direction (by momentarily closing switch 39). The Helmholtz coil current is adjusted at 21 to a current intensity $I_1$ such as to bring the needle to an arbitrarily selected position such as the center of scale 28—not necessarily the true balance position (the true balance position being the position the needle would take if it were subjected to no magnetic forces at all). The coil current is then changed by an arbitrary, known amount, $\Delta I$, to get a calibrating deflection to measure the relative strength of the needle. The needle magnetism is then reversed at 36 and the Helmholtz coil current is increased or decreased if necessary to obtain a current $I_2$ just sufficient to regain the original arbitrary scale position. The current is again shifted by a known amount, which may be an amount equal to $\Delta I$ or a different amount just so it is known; to get a second calibrating deflection to measure the relative strength of the reversed needle. The ratio S of the two calibrating deflections is determined and the Helmholtz coil currents $I_1$, and $I_2$, are noted. These quantities are substituted into the equation developed below, to get the value of V (the intensity of the vertical component of the terrestrial magnetic field, expressed in gauss units or gammas; 1 gamma= 0.00001 gauss).

If $M_1$ and $M_2$ are the values of the magnetic moment of the balance for the two directions of magnetization, the following torque equations can be written, where $mgb$ is the gravitational restoring moment as described, and C is the coil constant, depending on the number of turns in coils 15 and 16, their radius and spacing, and to some extent on the length and depth of the winding in cross section and on the length of the needle. This constant can be determined once for all for the apparatus.

$$M_1(V-CI_2)+mgb=0$$

$$M_2(V-CI_2)+mgb=0$$

Since the balance is made in the same position in each case, $b$ must be equal in the two expressions and hence $mgb$ must be equal, and the equations can be combined as follows:

$$\frac{M_2}{M_1}=\frac{V-CI_1}{V-CI_2}$$

$M_1$ and $M_2$ are opposite in sign, but nearly equal. Calling their ratio S and solving for V, $$V=\frac{C(SI_2-I_1)}{S-1}$$

It is necessary to determine the ratio S of the magnetic moment of the balance in the two directions of magnetization because the moments are usually not quite the same. Since the sensitivity of the balance is proportional to the magnetic moment, the ratio S can be determined by taking the ratio of deflections for the same change of current and opposite directions of magnetization.

If S happens to be unity, or practically unity, which is unusual, the two values of I can be averaged to determine the value of V. The average value of I is simply multiplied by the coil constant C.

When the needle polarity is reversed in the procedure described, the needle moves from its original arbitrarily selected position to a position approximately an equal distance on the opposite side of the true balance point. Thus reversal of the needle reveals the approximate true balance point and the amount of deflection upon reversal indicates how well the earth's field is neutralized by the Helmholtz coil.

If the vertical component of the earth's field is exactly neutralized or if the needle is completely demagnetized, the magnetic force is zero and the needle assumes the true balance position. An effort is made to balance the needle mechanically so that the true balance position falls on the center of the scale. The system of making measurements is then simplified. However, the balance is very delicate and shifts about somewhat as the knife edges wear, so that the true balance position is seldom at mid-scale and may even be off-scale. In practice, the true balance position can be ignored, as in the second modification of the method described, or if desired may be used to advantage by balancing the instrument at the true balance point provided that the true balance point is on the scale and drifts so gradually that its position is always predictable.

In the operation of the instrument the needle 10 never departs from horizontal by more than a very few degrees. Thus the reversing coils 34 and 35 can be mounted quite close to the needle as shown.

Any difficulty due to impossibility of exact adjustment of the adjustable resistance 21 can be obviated applying an additional, adjustable magnetic field, with the aid of one or more small permanent magnets 31, of calibrated magnetic properties, arranged along the central vertical axis of the system as shown and adapted for vertical adjustment. A scale 32 shows the magnet position. Assuming the balance to have been brought closely to balance by adjustment of resistance 21 as described above, then exact balance is secured by vertical adjustment of magnet 31, and the value of V corrected according to the scale reading at 32. It is also convenient to provide a second small magnet alined with the first, as indicated at 33, which can be moved up or down to any of several fixed positions, and which serves to extend the range of magnet 31. One convenient procedure is to have magnet 33 of polarity opposite to that of 31 (as shown) and to set magnet 33 so that the resulant effect at the balance proper due to both compensating magnets is zero when magnet 31 is at a certain intermediate mark on the scale 32. Then moving magnet 31 up or down will give a positive or a negative compensating effect respectively. If desired, scale 32 can be calibrated in terms of effective coil-current change, and its readings simply added to or subtracted from the measured coil current prior to calculating V as described above.

The apparatus has been described in its simplified form. Provision of suitable casings, leveling devices, temperature controls, etc. to facilitate use of the apparatus in the field is within the expected skill of those versed in the art and such details require no description.

What I claim is:

1. An apparatus for the absolute measurement on the null principle of the vertical intensity of the terrestrial magnetic field comprising in combination a magnet, supporting means for the magnet constructed and arranged to allow it to tip up and down but preventing movement thereof in other directions, means for applying a uniform magnetic field in the vicinity of the magnet of intensity sufficient to substantially neutralize the effect of the terrestrial magnetic field on the magnet, means for measuring the intensity of said applied magnetic field, and means for reversing the polarity of the magnet at will.

2. An apparatus for the absolute measurement on the null principle of the vertical intensity of the terrestrial magnetic field, comprising in combination a magnet, supporting means for the magnet constructed and arranged to allow it to tip up and down but preventing movement thereof in other directions, means for applying a uniform magnetic field in the vicinity of the magnet of intensity sufficient to substantially neutralize the effect of the earth's magnetic field on the magnet, means for measuring the intensity of said applied magnetic field, a pair of fixed coils surrounding the two end portions of the magnet and spaced therefrom, and electrical means for energizing said coils, so that the polarity of the magnet can be reversed at will.

3. A method of measuring the vertical intensity of the terrestrial magnetic field which comprises the operations of supporting a magnet approximately at its center of gravity in such a manner as to limit its motion to rotation about a north-south axis, applying a magnetic field of strength sufficient to substantially counteract the effect of the earth's magnetic field on the magnet, and reversing the polarity of the magnet to eliminate errors due to imperfect mechanical balance of the magnet.

4. A method of measuring the vertictal intensity of the terrestrial magnetic field which comprises the operations of supporting a magnet near its center of gravity in such manner that its movement is constrained to rotation in a vertical east-west plane, applying to the region about the magnet a magnetic field of strength sufficient to substantially counterbalance the effect of the earth's magnetic field on the magnet, reversing the polarity of the magnet back and forth and adjusting the applied field strength until the magnet remains stationary upon reversal of its polarity, and measuring the strength of said applied field.

5. A method of measuring the vertical intensity of the terrestrial magnetic field which comprises the operations of supporting a magnet in the terrestrial magnetic field free to oscillate in a vertical east-west plane but constrained from movement in other planes, applying to the region about the magnet a magnetic field of strength sufficient to bring the magnet to a reference position, changing the applied field strength a known amount, reversing the polarity of the magnet, again applying a magnetic field of strength sufficient to bring the magnet to said reference position and again changing the applied field strength a known amount, whereby said vertical intensity can be found by computation from said measurements.

VICTOR V. VACQUIER.